United States Patent [19]

Phillips

[11] Patent Number: 4,983,063

[45] Date of Patent: Jan. 8, 1991

[54] BICYCLE SEAT ADAPTER

[76] Inventor: Terry J. Phillips, 12842 Morning Glory Tr., Chesterland, Ohio 44026

[21] Appl. No.: 508,911

[22] Filed: Apr. 12, 1990

[51] Int. Cl.[5] ............................ F16B 1/00; F16D 1/00
[52] U.S. Cl. ......................................... 403/4; 403/87; 297/195
[58] Field of Search ....................... 297/195; 403/87, 4

[56] References Cited

U.S. PATENT DOCUMENTS 4,421,357 12/1983 Shimano .............................. 297/195
4,836,604 6/1989 Romano .............................. 297/195

Primary Examiner—Andrew V. Kundrat
Attorney, Agent, or Firm—Oldham & Oldham Co.

[57] ABSTRACT

A bicycle seat adapter which is positioned between the bicycle seat and the bicycle seat post to provide a wider range of seat positions. This device offers a rider alternative seat positions which increases rider comfort, improves the riders aerodynamic position and manages energy transfer from the rider's legs to the drive train.

14 Claims, 3 Drawing Sheets

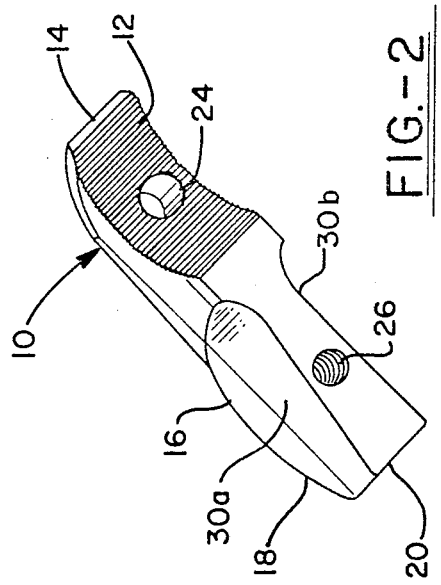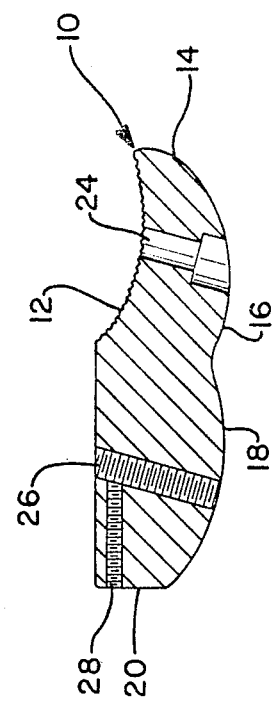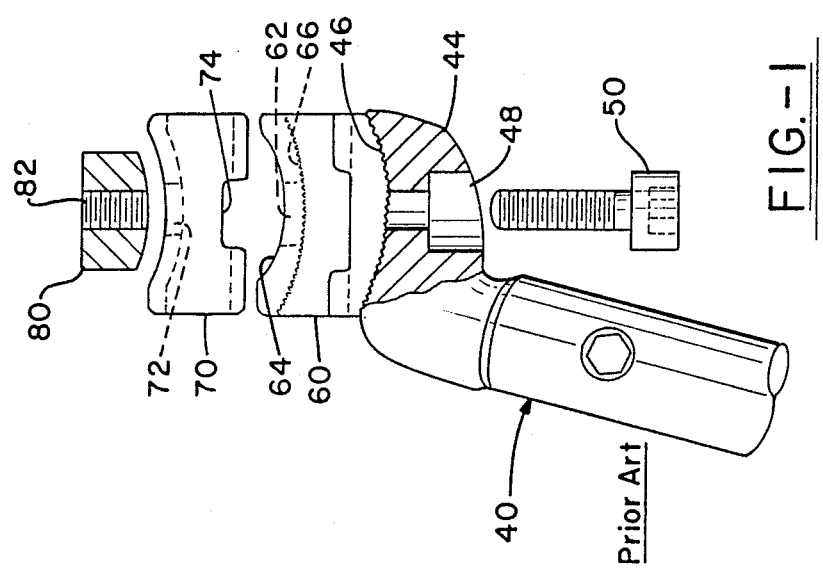

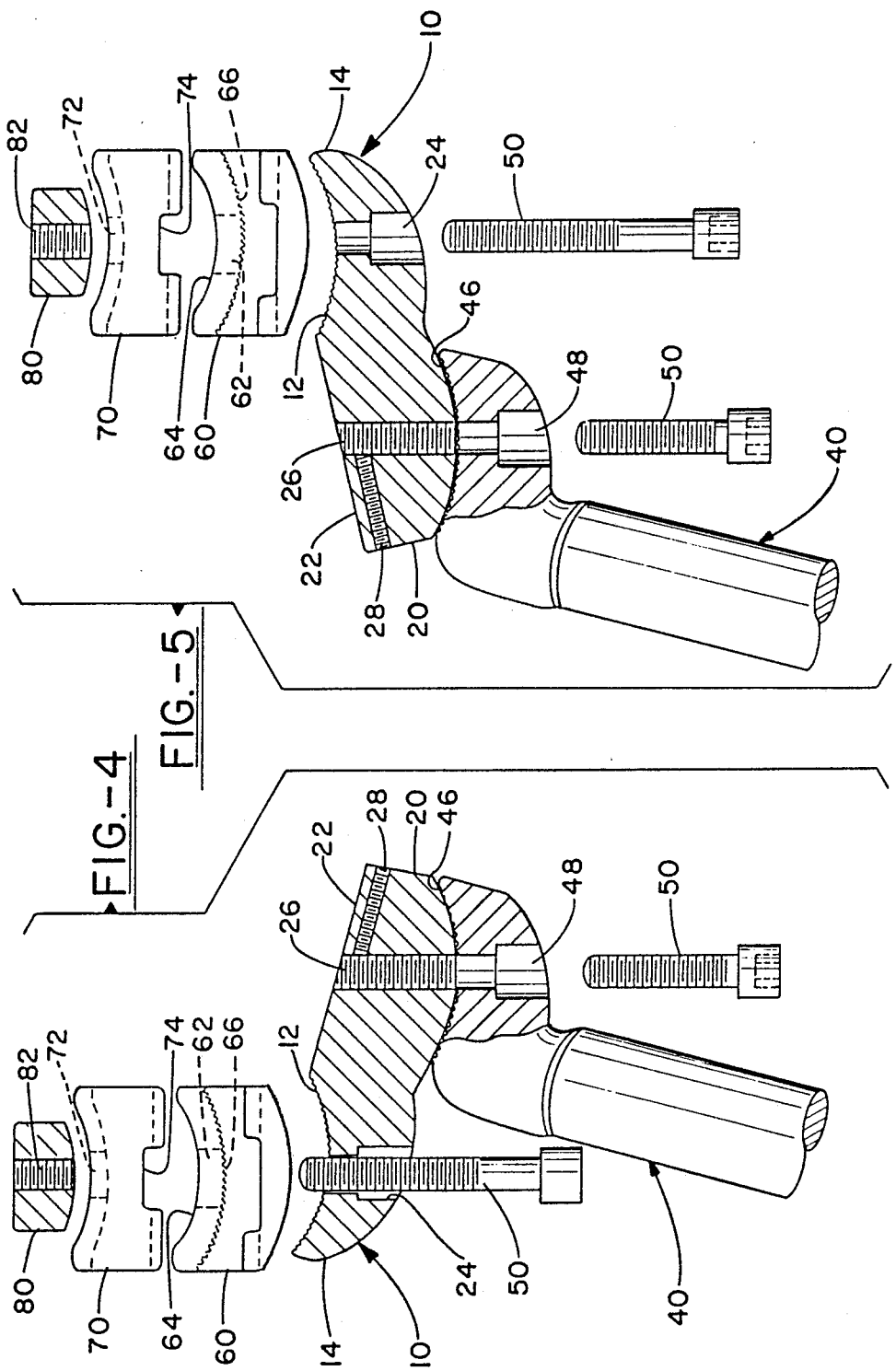

BICYCLE SEAT ADAPTER

TECHNICAL FIELD

The present invention relates to an adapter for a bicycle seat. More specifically, it relates to a platform which connects to the seat post of a bicycle and subsequently attaches to the bicycle seat to provide an expanded range of seat positions.

BACKGROUND OF THE INVENTION

In the past several years, bicycling has seen a big resurgence in popularity. This resurgence, aided by a renewed interest in personal fitness has seen more and more people enjoying the sport at all levels of expertise.

Many people bicycle for recreation and the chance to enjoy the outdoors. However, bicycling has become more technologically sophisticated and competition is found in a variety of settings and levels of expertise. The advent of bicycle motorcross, especially popular with youngsters and teenagers, challenges the participants with grueling races over rugged terrain. Mountain and city bikes have evolved as the newest way of touring varied terrain, often times providing an intense form of recreation. These bicycles have extremely durable frames, wide tires and multiple gears.

However, mans' guest for and love of speed and endurance cannot be denied. Bicycles' races and triathalons, one third of which is bicycling, are enjoying much success. The sport of cycling is always in pursuit of better aerodynamics, greater comfort for the rider and, of course, more speed.

The bicycle seat plays an important part in attaining better aerodynamics and, hence, more speed without sacrificing rider comfort. Conventional bicycle posts are tubular structures inserted into a portion of the frame and retained in a fixed position. One end of this post is inserted into a bracket attached to the seat. The seat can be pivoted around one or more nut/bolt combinations on this bracket.

A more recent type of seat post used on bicycles is commonly referred to as a "micro adjust". A micro adjust comprises a tubular structure which fits into the frame. However, on the post end which connects to the seat, an essentially horizontal platform having a concave surface is provided to receive the saddle clamps. The concave surface of this platform can be serrated and such serrations provide the ability to tilt the saddle in various positions.

However, the limited range within which the seat can be adjusted is not always sufficient. Bicyclists, especially, these involved in various competitions, require the seat or saddle to adjust within a range not possible with these known seat/seat posts in order to attain a maximal aerodynamic position, comfort and stability. The present invention provides a novel device to satisfy this need.

SUMMARY OF THE INVENTION

The present invention, generally stated, provides an adapter which increases the adjustability of a bicycle seat or saddle. More specifically, the present invention provides a platform added to a micro adjust seat post which provides expanded adjustability of the saddle's position by relocating the saddle position relating to the seat post.

It is, therefore, an object of the present invention to provide a bicycle seat adapter which can be added to a standard micro adjust seat post.

It is an object of the present invention to provide a bicycle seat adapter which provides the user with a greatly expanded range of positions for the bike seat.

It is also an object of the present invention to provide a bicycle seat adapter which maintains the stability of the rider while supplying increased adjustability of seat positions.

It is a further object of the present invention to provide a bicycle seat adapter which can be quickly and easily installed on most bicycle seat posts.

It is still a further object of the present invention to provide a bicycle seat adapter which is relative inexpensive for the manufacturer to produce and for the consumer to purchase.

It is still a further object of the present invention to provide a bicycle seat adapter which aids the user in achieving a maximal aerodynamic position on the bicycle.

It is still a further object of the present inventions to provide a bicycle seat adapter which maximizes energy transfer from the cyclist's legs to the drive train.

It is still a further object of the present invention to provide a bicycle seat adapter which provides an easy and effective place to attach certain accessories.

These and other objects and advantages of the present invention will become more readily apparent from the more detailed description of the preferred embodiment taken in conjunction with the drawings. Such objects and advantages are achieved by a bicycle seat adapter comprising:

an elongated block having at least a first surface and a second surface, said first surface comprising a recessed area capable of receiving a clamp assembly from a bicycle seat, said second surface comprising a convex area capable of interfacing with a corresponding concave surface of a bicycle seat post, a means for securing said clamp assembly to said seat adapter, a means for securing said seat adapter to said bicycle seat post.

BRIEF DESCRIPTION OF THE DRAWINGS

In order to better understand the present invention, reference is made to the accompanying drawings, wherein:

FIG. 1 is an exploded view of the prior art illustrating a micro adjust seat post to which the saddle clamps of a bicycle saddle may be attached.

FIG. 2 is a perspective view of the present invention which is a device for increasing the adjustability of bicycle seats.

FIG. 3 is a longitudinal cross sectional view of the present invention for increasing the adjustability of bicycle seats.

FIG. 4 is an exploded view of the present invention as installed on the seat post and connecting with the saddle clamps of a bicycle saddle.

FIG. 5 is another exploded view of the present invention as installed in an alternative fashion or a bicycle seat post and connecting with the saddle clamps of a bicycle saddle.

DETAILED DESCRIPTION OF THE PREFERRED EMBODIMENT

Figure 6:
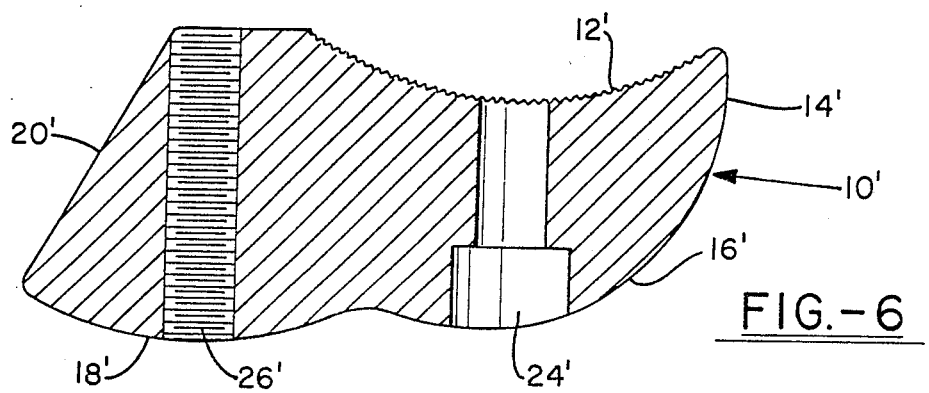
FIG. 6 is a longitudinal cross sectional view of an alternative embodiment of the present invention.

This invention will be described in detail with reference to the preferred embodiment thereof. Like elements are identified by like reference numerals throughout the drawings and specification.

Now, with reference to FIG. 1, the prior art illustrating a micro adjust seat post 40 is shown as it operatively connects to the saddle clamps of a bicycle saddle. The micro adjust seat post 40 is well known in the art and is generally a hollow tubular structure made of aluminum, titanium or other metal alloys. One end of this tubular seat post 40 is inserted into a tubular portion of the bicycle frame having a diameter slightly larger than the diameter of the seat post 40 and designed to receive the seat post 40.

On the end of seat post 40 opposite the end inserted into the frame, an essentially horizontal platform 44 is integrally attached such that the seat post 40 and the platform 44 form a modified and inverted "L" ' shaped configuration. This platform 44 has a concave recession 46 formed in its top outer surface. This concave surface commonly has a radius of approximately 30 mm. This surface declines at an angle of approximately 3° on each side of a longitudinal centerline. These two angled surfaces are serrated with a 0.25 mm deep sine wave pattern having a 1 mm pitch cut transverse to a longitudinal centerline.

The saddle is attached to the seat post 40 by an upper and lower saddle clamp 60 and 70 respectively. The lower saddle clamp 60 has a convex serrated bottom surface 66 which interfaces with the serrations on the concave surface 46 of seat post 40.

An 8 mm socket head cap screw 50 passes first through aperture 48 in micro adjust post 40 and subsequently through apertures 62 and 72 in lower and upper saddle clamps 60 and 70. Screw 50 is held in place by nut 80.

Aperture 62 and 72 in lower and upper saddle clamps are elongated to permit the clamp assembly to be positioned at various angles relative to seat post 40. Standard bicycle saddles or seats generally have one steel bar on each side of the seat's longitudinal axis. Each bar passes through and is held in place by the clamp assembly. These standard bicycle saddles permit a longitudinal adjustment of the seat relative to the frame of up to about 25 mm.

The present invention, generally 10 comprises a platform or adapter which increases the adjustability of a standard bicycle seat. This is accomplished by relocating the original seat position relative to the seat post. FIG. 2 discloses the device 10 in a perspective view. Device 10 is an elongated structure wherein the length is substantially greater than the corresponding width or thickness. Device 10 has an upper surface comprising a planar section 22 and a concave, generally arcuate surface 12. Planar section 22 and arcuate surface 12 intersect at a line generally transverse to the longitudinal axis. Arcuate surface 12 has serrations, cut transverse to the longitudinal axis, to assist in gripping.

Device 10 has a lower surface comprising two convex, essentially arcuate surfaces 16 and 18 which intersect at an approximate midline, transverse to the longitudinal axis. Arcuate surface 18 may have transverse serrations to assist in gripping.

Arcuate surface 12 and arcuate surface 16 intersect at a common point to define the front portion 14 of device 10. Planar surface 20 intersects planar section 22 at an essentially right angle along the upper surface and intersects arcuate surface 18 to define the rear of device 10.

The present invention is a platform or adapter 10 which may be forged, cast or machined from various metal materials. Aluminum and related alloys are the preferred composition but steel, titanium and other alloys are contemplated.

Device 10 is to be installed between micro adjust seat post 40 and lower saddle clamp 60. The present invention significantly increases the forward and backward adjustability of the bicycle seat along the bicycle's longitudinal axis from about 10 mm up to about 50 mm. Device 10 accomplishes such adjustablility by offering alternative positions for relocating the seat relative to the seat post 40. Such adjustment is desirable to increase the rider's comfort, aerodynamic posture and stability especially in bicycle racing.

Often times during the course of a bicycle race, the rider will not be seated with his/her full weight on the seat. Instead the rider will be almost standing on the pedals and relying on the seat merely to maintain his/her weight centered over the bicycle's longitudinal axis. Therefore, a seat which has been relocated forward towards the bicycle's handlebars is desirable. This is achieved by placing arcuate surface 18 of device 10 on corresponding arcuate surface 46 of seat post 40 such that front portion 14 of device 10 points toward the front of the bicycle as illustrated in FIG. 4.

A rearward adjustment of the seat's position may be equally desirable in certain circumstances. Although bicycles can be purchased in various sizes, no two riders have the exact same measurements. However, few people can afford to have a bicycle custom designed for their measurements, but must instead choose from among one of the standard bicycle sizes. An individual with long legs and/or a long torso may require a bicycle seat which can be adjusted towards the rear of the bicycle further than a standard seat will allow. The present invention accomplishes such adjustments by positioning arcuate surface 18 of device 1 on corresponding arcuate surface of seat post 40 in such a way that front portion 14 points toward the rear of the bicycles as illustrated in FIG. 5.

While device 10 provides a desirable increase in the range of saddle or seat mounting positions, excessive adjustment forward or backward must be avoided. A correctly positioned saddle is positioned such that its nose just brushes the back of the riders legs during climbs and sprints. If the front edge of the saddle is farther forward than a vertical line running through the bicycle's crank center, the saddle may interfere with the back of the rider's legs when standing up. Additionally, a platform device 10 of excessive length may weaken or be unable to support the weight of a rider when stressed.

Device 10 is secured to seat post 40 by a standard bolt. Bolt 50 is inserted into aperture 48 from the bottom and into threaded aperture 26 in device 10. Aperture 26 is shown in FIGS. 4 and 5 as having open ends on surfaces 18 and 22 and cut generally transverse to the longitudinal axis of device 10. Aperture 26 is threaded and has a diameter slightly larger than the diameter of bolt 50 such that bolt 50 threadably engages threads of aperture 26. An alternative embodiment has aperture 26 as having one open end in surface 18 and being cut through a substantial portion of device 10. Still a further embodiment contemplates bolt 50 as passing through aperture 26 and extending a substantial length above surface 22. A seat is contemplated as being formed on surface 22 which receives and retains a nut which threadably engages bolt 50.

The bicycle seat is installed by passing the bars of the seat between the upper and lower saddle clamps 60 and 70. The clamp assembly is placed on device 10 such that surface 66 of lower clamp 60 rests on corresponding arcuate surface 12 of device 10. Lower saddle clamp 60 may have serrations which will interlock with serrations on the arcuate surface 12 to prevent moving or slipping of the seat once it has been secured to device 10.

Upper and lower saddle clamps 70 and 60 are secured to device 10 by a standard nut 80 and bolt 50 assembly. Bolt 50 is inserted up through aperture 24 and through elongated apertures 62 and 72 in the lower and upper saddle clamps 60 and 70 respectively. Aperture 24 has a first bore with a diameter slightly larger than the diameter of bolt 50 to allow the shaft of bolt 50 to pass through it. Aperture 24, in FIGS. 4 and 5 is shown as being cut transverse to the longitudinal axis of the device and having open ends on surfaces 12 and 16. Aperture 24 has a second bore of slightly greater diameter than the first bore. Second bore of aperture 24 is dimensioned to receive the head of bolt 50 such that bolt 50 is seated securely therein.

The bicycle seat can be adjusted parallel to the bicycle's longitudinal axis, above or below its horizontal axis by loosening nut 80 from bolt 50. Apertures 62 and 72 in lower and upper saddle clamps are elongated to permit clamp assembly to be pitched from a horizontal axis relative to the seat post 40.

Figure 8:
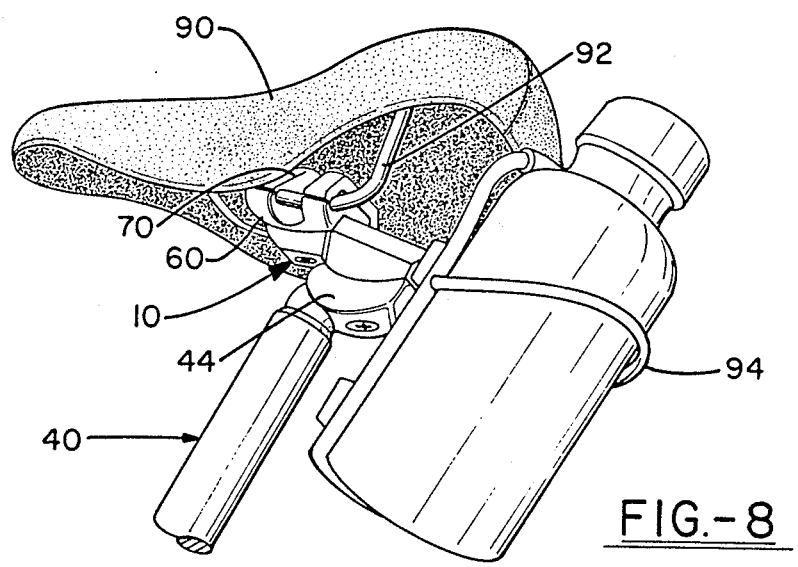
FIG. 8 is a perspective view of the present invention as installed with a bicycle seat, seat post and accessory.

Aperture 28 shown in FIG. 3, 4 and 5 is cut into device 10 essentially parallel to planar section 22 of the devices upper surface. Aperture 28 has one open end in back wall 20 and longitudinally into device 10. Such aperture 28 is threaded and dimensioned so as to provide a securing site for the attachment of bicycle accessories including but not limited to water bottle cage, saddle bags, reflectors and lights. FIG. 8 illustrates device 10 as installed with a bicycle seat, seat post and water bottle cage.

Figure 7:
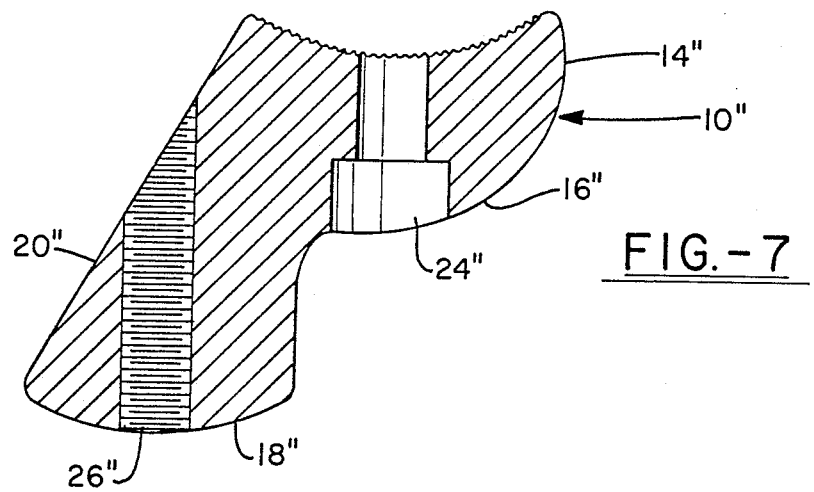
FIG. 7 is a longitudinal cross sectional view of another alternative embodiment of the present invention.

FIG. 6 discloses an alternative embodiment of device 10 has a shorter overall length and is designed for use on road racing bicycles. FIG. 7 discloses another alternative embodiment of device 10 which has a shorter overall length, but has an increased height to allow the saddle to be located further above the seat post 40.

While in accordance with the patent statutes the best mode and preferred embodiment of the invention has been described, it is to be understood that the invention is not limited thereto, but rather is to be measured by the scope and spirit of the appended claims.

What is claimed is:

1. A bicycle seat adapter comprising:
    an elongated block having at least a first surface and a second surface offset axially along the direction of elongation,
    said first surface comprising a recessed area capable of receiving a clamp assembly from a bicycle
    said second surface comprising a convex area capable of interfacing with a corresponding concave surface of a bicycle seat post,
    a means for securing said clamp assembly to said seat adapter,
    a means for securing said seat adapter to said bicycle seat post.

2. The bicycle seat adapter as recited in claim 1, wherein,
    said adapter further comprises a bore cut therethrough and intersecting said recessed portion of said first surface, said bore dimensioned to allow passage of a bolt shaft therethrough.

3. The bicycle seat adapter as recited in claim 2, wherein,
    said bore further comprises a counter bore dimensioned to receive the head of a bolt.

4. The bicycle seat adapter as recited in claim 1, wherein,
    said recessed area of said first surface comprises a plurality of serrations on its outer surface.

5. The bicycle seat adapter as recited in claim 1, wherein,
    said adapter further comprises an bore cut therethrough and intersecting said convex area of said second surface, said bore dimensioned to allow passage of a bolt shaft therethrough.

6. The bicycle seat adapter as recited in claim 5, wherein,
    said aperture intersecting said convex area further comprises threads capable of engaging corresponding threads on said bolt.

7. The bicycle seat adapter as recited in claim 1, wherein,
    said convex area of said second surface comprises a plurality of serrations on its outer surface.

8. The bicycle seat adapter as recited in claim 1, wherein,
    said adapter has an aperture with one open end cut therein to serve as an attachment site for bicycle accessories.

9. The bicycle seat adapter as cited in claim 8, wherein,
    said aperture comprises threads capable of engaging corresponding threads of a bolt.

10. The bicycle seat adapter as recited in claim 8, wherein,
    said aperture is cut along a longitudinal line of said block.

11. The bicycle seat adapter as recited in claim 1, wherein,
    said adapter is made from metal alloys.

12. The bicycle seat adapter as recited in claim 1, wherein,
    said adapter is made from steel.

13. The bicycle seat adapter as recited in claim 1, wherein,
    said adapter is made from an aluminum alloy.

14. The bicycle seat adapter as recited in claim 1, wherein,
    said adapter is made from an titanium alloy.

* * * * *